United States Patent [19]

Cairns et al.

[11] 3,966,645

[45] June 29, 1976

[54] CATALYST

[75] Inventors: James Anthony Cairns, Wantage; Stanley Frederick Pugh, Abingdon, both of England

[73] Assignee: United Kingdom Atomic Energy Authority, London, England

[22] Filed: Feb. 14, 1975

[21] Appl. No.: 550,146

[30] Foreign Application Priority Data

Feb. 22, 1974 United Kingdom............... 8303/74
May 13, 1974 United Kingdom............. 20988/74

[52] U.S. Cl. ........................ 252/465; 252/466 J; 252/477 R; 423/213.2; 423/213.5
[51] Int. Cl.² .................. B01J 21/04; B01J 23/84; B01J 35/02
[58] Field of Search ............ 252/477 R, 465, 466 J; 427/383; 204/192; 423/213.2, 213.5

[56] References Cited

UNITED STATES PATENTS

| | | | |
|---|---|---|---|
| 3,437,605 | 4/1969 | Keith ........................... | 252/477 R |
| 3,533,964 | 10/1970 | Rochow ....................... | 252/477 R |
| 3,773,894 | 11/1973 | Bernstein et al. ............. | 252/474 X |
| 3,883,307 | 5/1975 | Kim ............................. | 252/477 R |

Primary Examiner—W. J. Shine
Attorney, Agent, or Firm—Larson, Taylor and Hinds

[57] ABSTRACT

A catalyst suitable, for example, for the treatment of car exhaust emissions comprises an unagglomerated atomic dispersion, said coated particles being in association with support material compatible with the coated particles, such that the support material and the coated particles are adhered together.

20 Claims, 2 Drawing Figures

U.S. Patent  June 29, 1976  3,966,645
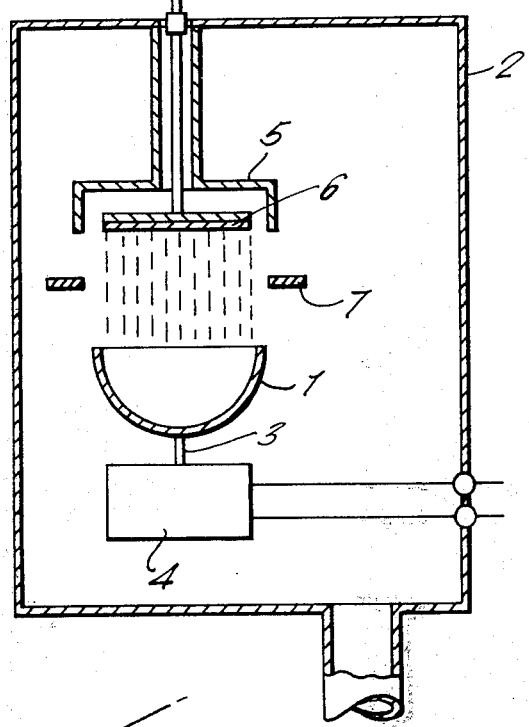
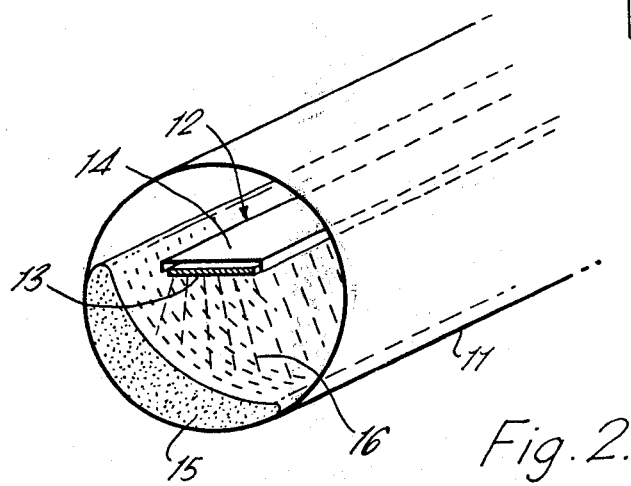

CATALYST

This invention relates to catalysts and their preparation.

There has been much interest in the use of catalysts for the treatment of motor vehicle exhaust gases to reduce or even eliminate the noxious constituents thereof. Such use, however, makes heavy demands on the catalyst, which has to withstand a severe environment and repeated thermal cycling throughout its working lifetime. Also, it is important, on economic grounds, that the catalytic material used in such a catalyst has a high catalytic activity per unit weight of catalytic material, particularly where the catalytic material is an expensive noble metal.

We have now prepared a catalyst which meets the above requirements and which also has application in fields other than the treatment of motor vehicle exhaust gases.

Thus, the present invention provides in one aspect a catalyst comprising particles compatible with and supporting a coating of catalytic materal, a major proportion of the coating comprising an unagglomerated atomic dispersion, said coated particles being in association with support material compatible with the coated particles, such that the support material and the coated particles are adhered together.

There is a wide range of applications for catalysts of the present invention. Tests on the catalysts have shown them to be highly suitable for the treatment of motor vehicle exhaust gases. Thus, the catalysts have, for example, exhibited a high level of catalytic activity for the oxidation of carbon monoxide, the oxidation of hydrocarbons and the reduction of oxides of nitrogen, and have suffered very little degradation of the catalytic material following repeated thermal cycling. Examples of further applications of the catalysts are in hydrogenation, gas burners, isomerisation, applications currently using base metal to avoid the expense of noble metal catalysts, treatment of gaseous effluents, and ignition systems.

The association between the coated particles and the support material may be in the form of the coated particles carried by the support material which form of association will be described in detail hereinafter. Alternatively, the association may be in the form of the coated particles carrying the support material.

The latter form of association involves providing the surfaces of coated particles with a partial covering of an active powder, the powder and the extent of the coverage being such as to enhance the catalytic activity of the final catalyst. A suitable coverage is 5 to 20% (e.g. 10%). It is preferred that the size of the powder coating a particular particle is not greater than one hundredth of the size of that particular particle. A particular example of the technique involves preparing a dispersion of sputter platinised α-alumina particles in an alumina sol, also containing -alumina, thereby to partially cover the platinised α-alumina, followed subsequently by firing to effect adhesion.

In the present catalyst, we prefer that the mean size of the particles is in the range from 100 A to 50 microns, within which range 1 to 25 microns is particularly preferred. We also prefer that the particles are spherical in shape. The reasons for these preferences are related to a method of preparing the catalyst which will be discussed hereinafter.

The particles must be compatible with the support material and with the catalytic material, and they must also be compatible with the reaction to be catalysed. Examples of particles, but conditional upon the above constraints, are various refractory non-metallic materials, especially oxides, such as alumina, silicon, mixtures or compounds of these with each other or with basic refractory oxides such as lime and magnesia, and carbon. They may be in highly refractory forms such as fused magnesia, highly calcined alumina, spinels and hydraulic cement.

The support material may take a variety of forms. For example, the support material may be a structure such as a sheet, which in turn may be flat, corrugated or otherwise shaped, or the support may be discrete particles (referred to hereafter for clarity as 'granules' but not limited by the meaning of that word) of larger average size than that of the treated particles. In another form the support material may be fibrous.

The support material in one form may be a honeycomb structure assembled from interleaved alternate flat and corrugated sheets, or a wire or perforated structure or mesh, or a coating on any of these.

When the support material takes the form of granules, these may range from a lower size limit which is a small multiple of the size of the treated particles (e.g. 20 times that size) to an upper limit determined solely by ease of handling and which may be many thousands of times the size of the treated particles. For example, the support material may be spherical or cylindrical pellets having a diameter of the order of one eighth of an inch.

As indicated above, the support material may be fibrous in nature and it may usefully take the form of a mat or bed of fibres. A specific example is the kaolin fibre sold under the name "Kaowool".

As another optional feature of our invention, the support material itself may possess catalytic activities, either itself or in combination with the catalytic material deposited on the particles and optionally also in combination with the material of the particles themselves.

A wide variety of support materials may be used in the present method, provided, of course, that the support material is compatible with the particles. Thus, the support material may, for example, consist of non-metallic material or it may consist of metallic material or it may comprise a combination of metallic and non-metallic materials, wherein for example, the particles are carried by the non-metallic material. Examples of support materials consisting of non-metallic material are an alumino silicate support, such as a fibrous kaolin support, and a ceramic support, such as silicon carbide. An example of a support material consisting of metallic material is an aluminium bearing ferritic alloy support.

We prefer, however, that the support material used is a support material which comprises a substrate carrying a continuous, adherent surface layer of carrier material obtainable by providing on the substrate a layer of carrier material, at least part of which comprises a gel, and firing. The surface layer may advantageously have fibres, such as kaolin fibres, incorporated therein to improve the ability of the support to retain coated particles during provision of the layer thereof. This is particularly useful when the particles are spherical and therefore difficult to retain. The surface layer may, for example, comprise an electrically insulating layer such as a refractory oxide (e.g. alumina, ceria, yttria, zirconia and titania). The substrate may, for example, consist of non-metallic material such as an aluminosilicate (e.g. fibrous kaolin) or a ceramic (e.g. silicon carbide), or the substrates may comprise an aluminum bearing ferritic alloy which has optionally been oxidised to form an essentially alumina layer on the surface thereof.

The aluminum bearing ferritic alloy is preferably an alloy of iron, chromium, aluminium and yttrium with proportion by weight lying preferably in range up to 20% chromium, 0.5 to 12% aluminium and 0.1 to 3% yttrium, and the balance iron.

The catalytic material used in the present method may, for example, be a noble metal and is preferably a platinum group metal, namely, ruthenium, rhodium, palladium, osmium, iridium or platinum, or an alloy of two or more platinum group metals. We particularly prefer that the catalytic material is platinum.

The coating of catalytic material may comprise a layer of sputtered material and may further comprise a monatomic layer.

The catalysts of the present invention may be prepared as follows, which constitutes a further aspect of the present invention. Thus, a method of preparing a catalyst comprises the steps of i. driving a substantially atomic dispersion of catalytic material at the surfaces of particles which are compatible with the material to attach onto the particle surfaces without agglomeration a major proportion of the atoms of the material impinging thereon thereby to provide a coating of the catalytic material; and ii. associating the particles, treated as in step (i), with support material for the catalytic material, wherein the support material is compatible with the treated particles, to adhere together the treated particles and the support material.

A benefit of the present method is that when it is applied to a porous support such as fibrous kaolin, it is possible to disperse the catalytic material throughout the body of the porous support uniformly and in depth, thereby enhancing the active area of the catalytic material. This benefit is in comparison with a method where catalytic material is sputtered directly onto a porous support, in which case the catalytic material is deposited only on the immediately available parts of the support.

Also, in the above mentioned direct deposition method, a problem in its application to mass production arises from the practical difficulty of transferring long lengths of support sheet through a vacuum system chamber for the catalytic material to be deposited. (We prefer to use a vacuum system as will be discussed hereinafter). Such a problem does not arise in the present method, since the catalytic material is deposited onto particulate material.

Step (ii) of the present method may comprise providing a layer of the particles, treated as in step (i), on the surface of the support material; and adhering the particles to the surface of the support material. We prefer to provide the layer of particles by transferring the treated particles onto the surface of the support material from a dispersion of the particles (e.g., by wash coating). When it is a requirement that the support material should possess more bulk than the treated particles. The support material may, for example, be contacted with a dispersion of the fine particles in a liquid medium, such as water, followed by drying. The liquid medium way, if desired, contain a binder and/or a wetting agent for improving the adhesion of the particles on the surface of the support and also for assisting in the provision of an even layer of particles.

Examples of binders which may be used are polyvinyl alcohol and water soluble cellulose ethers.

Examples of wetting agents which may be used are ethylene oxide condensates such as "Nonidet P40" which is an octylphenol ethylene oxide condensate, and "Tergitol NPX" which is an alkyl phenol ether of polyethylene glycol.

The concentration of the dispersion is of some importance. Thus, if it is too dilute, the surface of the support material will be incompletely covered; if it is too concentrated, the layer will be too thick and hence the coated particles will be employed uneconomically.

The mean size of the particles is conveniently in the range from 1 to 25 microns. It may, however, be possible to use particles having a mean size outside of this range, though we believe that it would be extremely difficult to satisfactorily provide particles of a mean size greater than 50 microns on the surface of the support material. Also, it may be difficult to prepare dispersions of larger particles; for example, it is very difficult to prepare a dispersion of $\alpha$-alumina particles in water when the particle size is greater than 25 microns and problems may be encountered in this respect when the particle size is between 10 microns and 25 microns. It should be noted that, when a non-aqueous liquid medium is used, such as an organic liquid, different limits will apply. A lower limit is created because of difficulties of providing very small particles with a coating of catalytic material and we believe that 100 A may represent a practical lower limit in this respect. Thus, it is very difficult to deposit catalytic material onto small particles in a vacuum system, because of difficulties of handling small particles in the vacuum system. A particularly preferred range of mean particle size is from 1 to 25 microns. We prefer that the particles are spherical in shape to facilitate provision of catalytic material thereon.

The adhering together of the treated particles and the surface of the support material may be achieved in different ways depending largely upon the nature of the support material. For example, when the support material is a structure of sheet, honeycomb or related type, the particles may be adhered to it by firing. Firing may be carried out in an atmosphere which is inert with respect to the materials present, such as an atmosphere of helium. The firing may be carried out at a temperature in the range from 200° to 1000°C.

When the support material is fibrous or granular, the particles may be adhered by firing such as that described above. Alternatively, in the case of a granular support material, especially one in which the granules are relatively small (for example in the range 10 microns to 1000 microns), the adhering may be achieved more simply be compacting the granules treated according to the present method into larger discrete units, for example pellets. Other components, either catalytically active or inert, may be incorporated with the treated granules into the larger units during the compacting step.

Another possibility when using a granular support, especially one as mentioned above in which the granules are relatively small, is to carry out the providing of the layer of treated particles and the adhering simultaneously. In this case, particles which have been treated in step (i) are compacted with support material granules, which may if desired be catalytically active, and as a result the provision of a layer of particles on the support material and the adhering of the particles to the support material are achieved in a single stage.

Step (i) of the present method is particularly valuable in that, because the catalytic material is deposited in a highly active form, it is possible to obtain catalytically active surface coatings for general catalysis applications with very much smaller quantities of catalytic material than may be possible by vapour deposition or deposition from solution. Furthermore, significantly greater activity per unit area of substrate can be achieved, as compared with catalyst deposited by a conventional technique. We prefer that deposition of the material is continued to provide an essentially monatomic or sub monatomic layer of the material upon the exposed area of the particles. Deposition of material which is a component of a catalytic system may be followed or accompanied by deposition of one or more other components which, in some cases after reaction with the first component, form the catalytic system. Alternatively, a catalytic system may be built up by depositing first a quantity of one component followed by a quantity of another component and repeating these steps in succession until the required compounded layer is built up. Furthermore, the particles themselves may be catalytically active, either in their own right or in combination with the material deposited on them.

The coating of catalytic material may be provided by sputtering catalytic material onto the particles by bombarding a source of the catalytic material in the neighbourhood of the particles with energetic ions, the conditions of atmosphere and selectivity of ions permitted to bombard the catalytic material being such that co-deposition upon the particles of unwanted material is avoided.

By energetic ions is meant ions having sufficient energy to cause useful sputtering of the source material. Impurities deposited upon the particles from the atmosphere in which the sputtering is carried out, or impurities arising from deposition of the bombarding ions themselves upon the particles may render the catalyst inactive or diminish its activity. On the other hand, some impurities deposited in this way may be tolerated. We therefore propose that the conditions of atmosphere and selectivity of ions permitted to bombard the source material are carefully controlled to avoid impairing the activity of the product catalyst. Thus, by unwanted material is meant material which, in the quantity co-deposited in practice of the method of the invention, unacceptably impairs the catalytic activity of the product.

Particularly good control of the process is obtained if the ions are provided by an ion beam from an accelerator, ion separator or an ion gun. In these circumstances we have found it necessary for the "atmosphere" to be a vacuum such that the mean free path of both ions and sputtered atoms is sufficient for efficient transfer and deposition of the sputtered atoms. Thus the vacuum should be of the order of or better than $10^{-4}$ to $10^{-6}$ Torr. Thus, we prefer that the source material and particles are mounted in a vacuum system and the source material is sputtered onto the particles by bombarding the source material with a beam of ions from an accelerator or ion beam separator or an ion gun.

As is well known in the art, it is possible to produce ion beams containing a particular selected ion to a high degree of purity. Although high purity is not necessarily essential, it is necessary that the ion beam will not result in contamination of the deposited catalyst. Consequently, in the method of the present invention, it is preferred to use a beam of inert gas such as Neon, Argon, Krypton, Xenon. Argon is preferred because it provides a good sputtering yield and is relativey inexpensive.

Alternatively, a glow discharge environment may be used.

The present invention further provides a catalyst system for treatment of exhaust gases in an internal combustion engine comprising a catalyst chamber, a catalyst according to the present invention mounted in the chamber, and means for supplying air and exhaust gases to the catalyst.

The invention still further provides a catalyst made by the method of the present invention.

The invention will now be particularly described in the following examples, where reference will be made to FIG. 1 of the accompanying drawings, wherein FIG. 1 is a diagrammatic sectional view of a glow discharge chamber with various components arranged for sputtering catalytic material onto particles.

EXAMPLE 1 a. Preparation of Support (this is not part of the present invention)

A plane sheet of "Fecralloy" (trade mark) aluminium bearing ferritic alloy comprising 15% Cr, 4% Al, 0.3% Y and remainder Fe of dimensions 2 inches wide and 0.0025 inches thick having a superimposed corrugation of depth 0.009 inches was heated in air at about 1000°C for about 24 hours in order to form an alumina layer. After cooling, the sheet was dipped into a sol comprising alumina (5g) in deionised water, (100 ml) wherein the sol contained microcrystallites of ca. 100 A mean particle size. The sheet was removed from the sol, drained and allowed to dry slowly overnight. The sheet was then placed in an air furnace and the temperature raised gradually at a rate of about 300°C/hour to 1100°C where it was held for 4 hours in order to fire the sheet.

b. Deposition of Platinum on Particles

Referring to FIG. 1, $\alpha$-alumina of average particle size 0.1 microns and prepared by the controlled sintering of $\alpha$-alumina, was contained in a cup 1 mounted in a glow discharge chamber 2. The cup 1 is connected, by means of a stem 3, to a vibrator 4. Also mounted within the chamber 2 is a glow discharge gun 5 have a platinum electrode 6 of dimensions 5 × 4 sq.cm. arranged for sputtered platinum atoms therefrom to impinge on the $\alpha$-alumina. Also, provided within the chamber 2 is a shield 7.

Sputtering of the $\alpha$-alumina was carried out in a vacuum of 10 $\mu$m of argon (after evacuation to reduce the oxygen content), at 2.5 KV and at a measured current of 200 milliamps. During the sputtering, the vibrator 4 was activated to keep the $\alpha$-alumina in constant movement so that substantially homogeneous deposition was achieved.

c. Preparation of Catalyst and Tests Thereon

Treated alumina particles, prepared as in (b) above, were dispersed in water to produce a 5% by weight dispersion. A support, prepared as in (a) above of dimension 2 × 2 sq.cm. was dipped into the dispersion, removed, dried in air and fired at 1000°C in a helium gas flow for 15 minutes. (Pt loading: 5 micrograms/cm$^2$).

This catalyst was placed in a helium gas flow in a catalytic test rig, surrounded by a heater, and in contact with a thermocouple assembly. 50 $\mu$l slugs of a 1:1 mixture of carbon monoxide: oxygen were passed over the catalyst at a space velocity of 140,000 and the oxidation of carbon monoxide measured as a function of temperature complete conversion of the carbon monoxide to carbon dioxide was achieved at 260°C.

The catalyst was then heated again to 1000°C in the helium gas stream for a further 15 minutes. It was then found complete conversion of the carbon monoxide slugs was achieved at a temperature of 215°C.

The catalyst showed no further improvement on a subsequent thermal cycling in helium at 1000°C for 15 minutes.

EXAMPLE 2

The procedure of Example 1 was repeated using, as a support, a sample of "Kaowool" kaolin fibre of dimensions 2 × 2 sq.cm. and 2 mm. thickness (the "Kaowool" had not been subjected to the treatment described in (a) of Example 1). A total platinum loading of 110 micrograms was obtained.

When the resulting catalyst was heated in the helium gas stream at 1000°C for 15 minutes it displayed complete conversion of the 50 $\mu$l carbon monoxide:oxygen slugs at a temperature of 200°C. A further heating at 1000°C in helium for 15 minutes improved this figure to 150°C, and a further heat treatment resulted in complete conversion of the carbon monoxide being achieved at 115°C. This performance was retained after heating again for 15 minutes at 1000°C in helium.

EXAMPLE 3 a. Preparation of Support

A plane sheet of unoxidised "Fecralloy" (Trade Mark) aluminium bearing ferritic alloy of dimensions 2 × 2 sq.cm. and 0.0125 cm. thickness was dipped into a sol (45 ml.) comprising a 10% by weight dispersion of alumina gel particles in deionised water, and a 1% solution of BDH Nonidet P40 (polyvinyl alcohol) wetting agent (20 drops) and a 2.5% solution of MOVIOL N85-88 (an octylphenol ethylene oxide condensate) binder (7 ml). The sol contained microcrystallites of a ca 100 A particle size. The sheet was then removed, dried in air, and heated in air at 1000°C for 1 hour to give the final catalyst support.

b. Deposition of Platinum on Particles

α-Alumina, of particle size in the range from 1 to 5 microns, was sputtered with platinum atoms in a glow discharge chamber in a vacuum of 10 $\mu$m. of argon, at 2.5 KV and at a measured current of 200 milliamps. This gave a platinum loading of 0.7%.

c. Preparation of Catalyst and Tests Thereon

The platinised alumina (9g) was dispersed in water containing a 1% solution of BDH Nonidet P40 (20 drops) and a 2.5% solution of MOVIOL N85-88 (7 ml.) to give a 45 ml of dispersion. The catalyst support prepared above was dipped into the dispersion, removed, dried in air, and fired at 1000°C in a helium gas flow for 15 minutes. The resulting catalyst, having a P$t$ loading of 5 micrograms/cm$^2$ was placed in a helium gas flow in a catalytic test rig, surrounded by a heater, and in contact with a thermocouple assembly. 50 $\mu$l slugs of a 1:1 mixture of carbon monoxide: oxygen were passed over the catalyst at a space velocity of 140,000 and the oxidation of carbon monoxide measured as a function of temperature. Complete conversion of the carbon monoxide to carbon dioxide was achieved at 190°C.

The catalyst was then heated for a further 30 minutes in the helium gas stream at 1000°C. It was then found that complete conversion of the carbon monoxide slugs was achieved at 125°C. The catalyst showed no further improvement on subsequent thermal cycling.

EXAMPLE 4

Alumina spheres ranging in diameter from 1 to 5 microns were sputter coated with platinum by the procedure described in Example 1 to give a platinum loading of 0.72% and then dispersed in a 10% boehmite sol. A portion of this dispersion was transferred to a dish containing 100 micron size alumina spheres which had been prepared by gel precipitation. The resulting slurry was evaporated to dryness. Examination of the product by scanning electron microscopy revealed the small platinised spheres adhering in a close packed manner to the larger spheres.

A portion (0.28 g) of the product having a platinum loading of 0.29% was used in the catalytic oxidation of propane. 100 microlitre slugs of a 5:1 mixture of oxygen and propane were passed through the portion of the product in a nitrogen carrier gas stream at a rate of 30 cc/minute. Complete oxidation of the propane was achieved at 250°C.

We have also devised an apparatus suitable for providing the catalytic material on the particles in step (i).

Thus, the present invention further provides apparatus for depositing material upon powder, granules or a like particulate substrate, which apparatus comprises an extended rotatable container, means for evacuating the containers, means within the container for generating an atomic, or substantially atomic, dispersion of the material to be deposited, and means for rotating the container.

In one arrangement according to the invention the means for generating an atomic or substantially atomic dispersion of the material to be deposited comprises an electronic glow discharge device. The glow discharge device generates ions which may themselves be of the material to be deposited or which may be caused to bombard a target of the material to sputter material therefrom. The glow discharge device comprises an anode and a cathode and, where the atomic or substantially atomic dispersion is to be generated by sputtering, at least part of the cathode comprises the said target.

Preferably the container is tubular and preferably the glow discharge device extends along the length of the tubular container.

A specific construction of apparatus embodying the invention will now be described by way of example and with reference to FIG. 2 of the accompanying drawings, wherein FIG. 2 is a diagrammatic perspective view, partly cut away, of the apparatus.

Referring to FIG. 2 a long tubular container 11 is adapted for evacuation, for example by mounting the container 11 within a vacuum vessel (not shown).

Extending along the length of the container 11 is fixed glow discharge device 12 comprising a long strip cathode 13 of material to be sputtered and an anode 14. The anode 14 is of channel section and screens the cathode on all but one face.

In operation, a particulate substrate 15 is introduced into the container 11 and the vacuum vessel is filled with inert gas, for example, argon, pumped down to about 50 micrometers of mercury. The tubular container is rotated and a high voltage, for example, 3 KV, applied across the electrodes 13,14 (which do not rotate with the container 11) to set up a glow discharge in the gas. Positive gas ions bombard the cathode 13 and a uniform spray of sputtered material is ejected in the direction indicated by the dashed lines 16 onto the particulate substrate 15. The sputtered material will be in the form of an atomic, or substantially atomic, dispersion. The stirring effect of rotating the container 11 continually exposes fresh surfaces of the particulate substrate 15 to coating by the sputtered atoms.

The apparatus is particularly suitable for coating substrate powders with layers of catalytic material, for example, in the method of the present invention.

A device as described above and of relatively modest dimensions could handle kilogram quantities of particulate material in batch processing, but it is envisaged that continuous or semi-continuous operation may be achieved by slightly tilting the tubular container so that powder could be fed into one end and out of the other.

Further, to enhance stirring, particularly of fine powder substrate the interior of the tubular container 11 may be roughened or provided with teeth or similar protruberances.

We claim:

1. A catalyst comprising particles, the exposed area of which supports a substantially homogeneous, sputtered coating of catalytic material, a major proportion of the coating comprising an unagglomerated atomic dispersion, said coated particles being in association with support material compatible with the coated particles, such that the support material and the coated particles are adhered together.

2. A catalyst according to claim 1, wherein the coated particles are carried by the support material.

3. A catalyst according to claim 2, wherein the mean size of the particles is in the range from 100 to 50 microns.

4. A catalyst according to claim 3, wherein the mean size of the particles is in the range from 1 to 25 microns.

5. A catalyst according to claim 2, wherein the particles are of a refractory oxide.

6. A catalyst according to claim 2, wherein the support material is in the form of one or more sheets.

7. A catalyst according to claim 2, wherein the support material is in the form of granules.

8. A catalyst according to claim 7, wherein the support material is a refractory oxide.

9. A catalyst according to claim 1 wherein the support material comprises an aluminum bearing ferritic alloy carrying an electrically insulating surface layer.

10. A catalyst according to claim 9 wherein the alloy is an alloy of iron, chromium, aluminum and yttrium with proportions by weight lying in the range up to 20% chromium, 0.5 to 12% aluminum and 0.1 to 3% yttrium and the balance iron.

11. A method of preparing a catalyst comprising the steps of
   i. sputtering catalytic material onto the surfaces of particles which are compatible with the catalytic material to attach onto the particle surfaces a coating of the catalytic material a major proportion of said coating comprising an unagglomerated atomic dispersion; and
   ii. associating the particles, treated as in step (i), with support material for the catalytic material, wherein the support material is compatible with the treated particles, to adhere together the treated particles and the support material.

12. A method according to claim 11, wherein step (ii) comprises providing a layer of the particles treated as in step (i) on the surface of the support material and adhering the particles to the surface of the support material.

13. A method according to claim 11, wherein the layer of particles is provided by contacting the support material with a dispersion of the particles in a liquid medium, followed by drying.

14. A method according to claim 11, wherein the adhering of the treated particles to the support material is effected by firing.

15. A method according to claim 11, wherein the adhering of the treated particles to the support material is effected by compacting.

16. A method according to claim 12, wherein the providing of the layer of the treated particles on the surface of the support material and the adhering of the treated particles to the support material is effected simultaneously.

17. A method according to claim 11 wherein the mean size of the particles is in the range from 1 to 25 microns.

18. A method according to claim 11 wherein the particles are of a refractory oxide.

19. A method according to claim 11 wherein the support material is in the form of granules.

20. A method according to claim 19 wherein the support material is a refractory oxide.

* * * * *